July 29, 1958 A. M. GRASS 2,844,959
FORCE MEASURING INSTRUMENT
Filed Feb. 17, 1955

*INVENTOR.*
ALBERT M. GRASS
BY *Kenway Jenney*
*Witt Hildreth*
ATTORNEYS

2,844,959

FORCE MEASURING INSTRUMENT

Albert M. Grass, Quincy, Mass.

Application February 17, 1955, Serial No. 488,746

4 Claims. (Cl. 73—141)

The present invention relates to a force measuring intrument or force-displacement transducer.

The object of the present invention is to provide a simple and highly accurate force measuring device in which the sensitivity or measuring range may be conveniently altered or adjusted. To this end the present invention comprises the measuring device hereinafter described and particularly defined in the claims.

In the accompanying drawings.

Figures 1, 2:
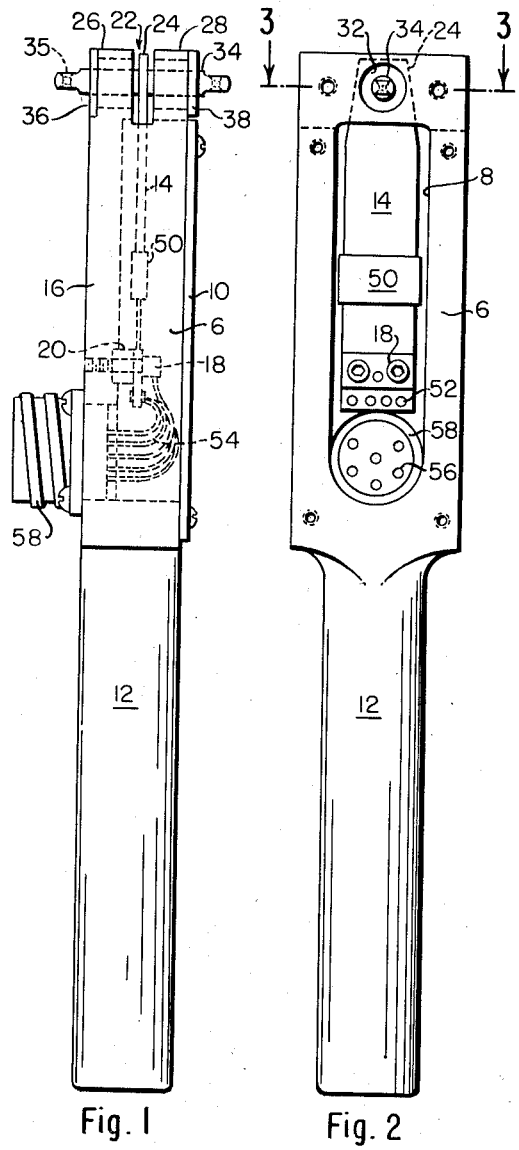
Fig. 1 is a side elevation of the preferred form of measuring device.
Fig. 2 is a rear elevation with the covers removed.

The illustrated embodiment of the invention comprises a metal body 6 hollowed as shown at 8 and provided with a rear suitable cover 10, which is removed in Fig. 2. The body is provided with a suitable rod-like handle or extension 12 by which the device may be conveniently mounted.

A cantilever measuring arm or strip 14 of flat metal is secured to the rear wall 16 of the body 6 by screws 18 and is spaced from the wall by suitable spacers 20. The end of the cantilever 14 extends through a slot 22 formed in the end of the body, and constitutes a tongue 24 disposed between two overlying portions 26 and 28 of the body. The portions 26 and 28 are formed with openings 30 and 32 respectively. An actuating rod 34 is secured to the tongue 24 and extends symmetrically therefrom through the openings 30 and 32. The actuating rod 34 is provided at its ends with openings 35 by which weights or force-applying devices may be suitably connected to the rod. Upon motion of the rod up or down, as viewed in Fig. 3, the cantilever is subjected to a bending stress.

Cover plates 36 and 38 are suitably attached to the overhanging portions 26 and 28 of the body by means of screws 40.

Figure 4:
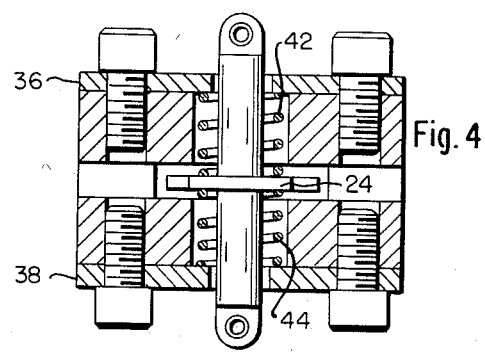
Figs. 4 and 5 are sectional elevations similar to Fig. 3 but with springs of different strengths for different sensitivities.
Figure 5:
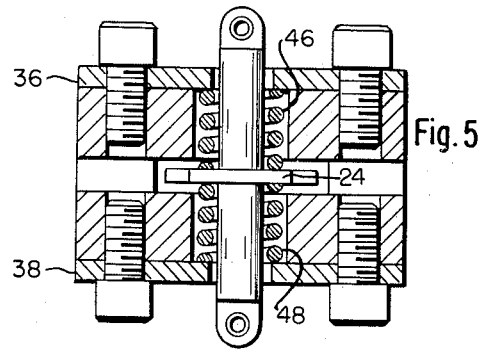

The sensitivity of the instrument as a force measuring device may be varied by applying coil springs thereto as shown in Figs. 4 and 5. To this end the openings 30 and 32 constitute chambers for receiving the springs. Thus, in Fig. 4 two light springs 42 and 44 are received in the upper and lower chambers while in Fig. 5 two heavier springs 46 and 48 are applied. In order to insert or remove the springs, the cover plates 36 and 38 are removed and later replaced. In Figs. 4 and 5 the springs 42, 44 (or 46, 48) bear against the tongue portion 24 of the cantilever and also against the inner surfaces of the cover plates. Each pair of srings 42, 44 (or 46, 48) is uniform in size and spring constant in order to maintain the tongue 24 centralized, regardless of which size of spring is used.

Figure 3:
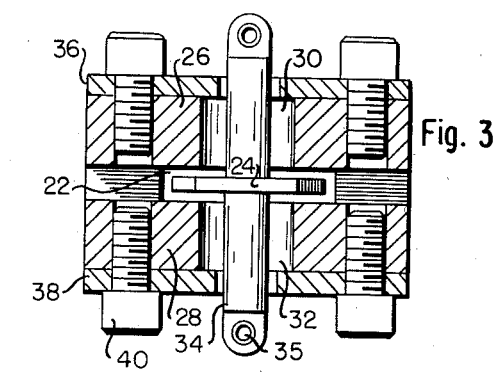
Fig. 3 is a section on line 3—3 of Fig. 2.

In the preferred construction for use as a small and precise measuring instrument, the maximum working range without springs as in Fig. 3, is 0.1 kgm. With the light spring shown in Fig. 4 the maximum working range is 1.0 kgm. while with the heavy spring shown in Fig. 5 the working range is 10.0 kgm.

The amount of flexure of the spring strip 14 under bending stress is preferably detected by a strain gage 50 applied to the strip in conventional manner and connected to an insulated terminal block 52. The connections between the strain gage and the terminal block are conventional and are not shown in the drawing. Connections 54 lead from the terminal block 52 to pins 56 of a cable connector 58 which is secured to the front wall of the body. The wires of the strain gage are preferably arranged in the form of a bridge and the amount of flexure on the strip is indicated by the amount of electrical unbalance of the bridge in accordance with usual measuring techniques.

The device has a high natural frequency and hence can be used for recording of rapidly varying forces applied to the actuating rod 34.

The cantilever is fairly stiff so that the maximum deflection is quite small, and the high sensitivity depends on the strain gage. The maximum deflection from center is about 0.5 mm. Owing to the stiffness of the cantilever, the instrument has a high natural frequency even without the coil springs. The stiffness factor, and therefore the natural frequency, is increased when the springs are applied.

The instrument may be used as a highly sensitive device for accurately measuring any small forces with small deflections. Because of the high natural frequency, it is especially useful for the measurement or recording of rapidly varying forces.

Having thus described the invention, I claim:

1. A force measuring instrument comprising an elongated body member, a cantilever spring arm secured in the body and having a tongue portion, the body having at its end portions overlying said tongue and defining a slot within which the tongue is free to move slightly, a strain gage on the cantilever arm, and a force-applying member secured to the tongue symmetrically extending therefrom and passing through said overlying portions of the body, the overlying portions of the body being formed with spring-receiving chambers on opposite sides of the tongue to accommodate centralizing coil springs.

2. A force measuring instrument comprising an elongated body member, a cantilever spring arm secured in the body and having a tongue portion, the body having at its end portions overlying said tongue and defining a slot within which the tongue is free to move slightly, a strain gage on the cantilever arm, and force applying means secured to the tongue, an actuating rod secured to the tongue and extending symmetrically therefrom, the overlying portions of the body being formed with spring-receiving chambers through which the rod passes, and centralizing coil springs received in the chambers and surrounding the actuating rod and bearing against the tongue.

3. A force measuring instrument comprising an elongated body member, a cantilever spring arm secured in the body and having a tonuge portion, the body having at its end portions overlying said tongue and defining a slot within which the tongue is free to move slightly, a strain gage on the cantilever arm, and a force applying means secured to the tongue extending symmetrically therefrom and passing through said overlying portions of the body, the overlying portions of the body being formed with spring receiving chambers on opposite sides of the tongue to accommodate centralizing coil springs, and a selected set of centralizing springs having desired spring constants, in said chambers bearing against the tongue.

4. A force measuring instrument comprising an elongated body member, a cantilever spring arm secured in the body and having a tongue portion, the body having at its end portions overlying said tongue and defining a slot within which the tongue is free to move slightly, a strain gage on the cantilever arm, and force applying means secured to the tongue, an actuating rod secured to the tongue and extending symmetrically therefrom, the overlying portions of the body being formed with spring-receiving chambers through which the rod passes, and a selected set of centralizing coil springs having desired spring constants received in the chambers and surrounding the actuating rod and bearing against the tongue.

References Cited in the file of this patent

UNITED STATES PATENTS

| | | |
|---|---|---|
| 2,423,867 | Zener et al. | July 15, 1947 |
| 2,681,566 | Ruge | June 22, 1954 |

FOREIGN PATENTS

| | | |
|---|---|---|
| 628,400 | Great Britain | Aug. 29, 1949 |